(12) United States Patent
Acciardi et al.

(10) Patent No.: US 10,315,721 B2
(45) Date of Patent: Jun. 11, 2019

(54) SELF-BALANCING SCOOTER DIFFERENTIAL CONTROL APPARATUS

(71) Applicant: HoverHandle, LLC, Shrewsbury, MA (US)

(72) Inventors: Edward George Acciardi, Grafton, MA (US); David Peter Cordella, Shrewsbury, MA (US); Andrew Michael Agbay, Shrewsbury, MA (US); Albert J. Agbay, Shrewsbury, MA (US); Bruce A. Horwitz, Newton, MA (US)

(73) Assignee: HoverHandle, LLC, Shrewsbury, MA (US)

( * ) Notice: Subject to any disclaimer, the term of this patent is extended or adjusted under 35 U.S.C. 154(b) by 124 days.

(21) Appl. No.: 15/356,934

(22) Filed: Nov. 21, 2016

(65) Prior Publication Data
US 2018/0029662 A1    Feb. 1, 2018

Related U.S. Application Data

(60) Provisional application No. 62/369,514, filed on Aug. 1, 2016.

(51) Int. Cl.
| | |
|---|---|
| *B62K 3/00* | (2006.01) |
| *B62K 21/12* | (2006.01) |
| *B62K 11/14* | (2006.01) |
| *B62K 11/00* | (2006.01) |

(52) U.S. Cl.
CPC ............ *B62K 11/14* (2013.01); *B62K 11/007* (2016.11); *B62K 21/12* (2013.01)

(58) Field of Classification Search
CPC ........ B62K 11/14; B62K 11/007; B62K 21/12
See application file for complete search history.

(56) References Cited

U.S. PATENT DOCUMENTS

| | | | |
|---|---|---|---|
| 6,302,230 B1 | 10/2001 | Kamen et al. | |
| 8,424,628 B1 | 4/2013 | Schade | |
| 8,738,278 B2 | 5/2014 | Chen | |
| 2010/0117316 A1 | 5/2010 | Weiner et al. | |
| 2013/0228385 A1 | 9/2013 | Chen | |
| 2014/0131126 A1* | 5/2014 | Martinelli | B62K 3/007 180/218 |
| 2015/0353158 A1* | 12/2015 | Chang | B62K 3/002 180/6.5 |
| 2016/0070269 A1 | 3/2016 | Kamen et al. | |
| 2016/0129963 A1 | 5/2016 | Ying et al. | |
| 2017/0213477 A1* | 7/2017 | Honeycutt | B62K 11/007 |
| 2018/0127047 A1* | 5/2018 | Lankford | B62K 11/007 |

FOREIGN PATENT DOCUMENTS

WO    2012160400 A1    11/2012

* cited by examiner

*Primary Examiner* — Tony H Winner
(74) *Attorney, Agent, or Firm* — BainwoodHuang (57) ABSTRACT

A differential control apparatus for a self-balancing scooter includes platform interfaces, such as clamping mechanisms, configured to be rigidly connected to respective foot platforms of the self-balancing scooter, and a differential drive coupler mechanically joined to the platform interfaces to impart differential rotational motion thereto in response to a mechanical control input. A rider interface control mechanism is connected to the differential drive coupler to supply the mechanical control input in response to user control actions to control movement of the self-balancing scooter in operation.

18 Claims, 13 Drawing Sheets

SELF-BALANCING SCOOTER DIFFERENTIAL CONTROL APPARATUS

BACKGROUND

The present invention generally relates to the field of self-balancing scooters and more specifically to the field of control mechanisms for self-balancing scooters.

A self-balancing scooter (SBS) is a recreational transportation vehicle or device designed to carry a single passenger. Typically, an SBS has two wheels mounted symmetrically on either side of a center line of the scooter and having a common axis of rotation. Each wheel is independently driven, and steering is accomplished by differential speed control of the two wheels.

One type of SBS has a unitary body with a footrest on which the passenger/rider stands. An example is shown in U.S. Pat. No. 6,302,230 and available as the "Segway®" from SEGWAY, INC., 14 Technology Drive, Bedford, N.H. 03110. This form of SBS is speed-controlled by tilting the body forward or backward, and it is steered by differentially increasing the speed of an "outside" wheel relative to an "inside" wheel. In the Segway "PT" device this differential speed control is accomplished by moving a "LeanSteer Frame", essentially a handle bar support shaft, to the left or right.

Another type of SBS employs a split body with mirror-image left and right halves, with each half having a drive wheel located on a common axis outboard of the rider's feet. An example of such an SBS is disclosed in U.S. Pat. No. 8,738,278 and is known colloquially as a "hoverboard". The left and right halves are rotationally coupled to each other, allowing relative rotation of approximately plus or minus 5° in the forward/backward direction. Each half of the hover board has its own motorized and servo controlled drive wheel for propulsion. Each wheel is driven by a brushless DC motor, controlled by rotational inputs that the rider makes to each half of the hoverboard by tilting his or her feet forward or backwards. When the feet are tilted in unison, the hoverboard moves forward or backwards in a straight line; when the feet are tilted at different angles, the hoverboard turns in the direction of the less-forward-tilted foot. If the feet are tilted by the same angle but in opposing directions, the hoverboard rotates about a vertical axis.

SUMMARY

Disclosed is a differential control mechanism that can be used with a hoverboard-type of SBS (HSBS). The disclosed control mechanism may be configured as an after-market add-on or as a component integrated into an SBS at the time of manufacture. As an add-on, the control mechanism leaves existing design and engineering of an HSBS substantially intact. If incorporated into an HSBS by a manufacturer, it can be implemented with substantially no functional impact on existing designs.

In one variation the disclosed apparatus can be designed as an accessory to be added-on to existing HSBS by, for example, the end user. In another variation the disclosed apparatus can be designed to be integral to an HSBS. In either the add-on or integral variation the disclosed apparatus can be configured to allow rapid removal and replacement of the user interface component, permitting the HSBS to quickly switch between "safe" and "sports" modes of operation.

In one variation the differential control mechanism is operated by a single, centrally positioned shaft. In one instance the shaft is pushed forward/pulled back for straight line travel forward or backward respectively and rotated/twisted clockwise or counterclockwise to turn right (viz., clockwise) or left (viz., counterclockwise) respectively. In such an embodiment, the inputs to the centrally positioned shaft may be substantially identical, in both direction and magnitude, to the inputs a rider makes on a child's scooter or a bicycle.

Generally in implementations, the differential control mechanism replaces the "tilt the feet forward/backward" movement of a conventional HSBS, which may be unnatural and/or awkward for users, with an alternative "steer left/steer right" and "go forward/go backward" control scheme, which may be more intuitive and natural. In addition, the mechanism generally provides a rider with an additional support point to assist with balance.

BRIEF DESCRIPTION OF THE SEVERAL VIEWS OF THE DRAWING

The foregoing and other objects, features and advantages will be apparent from the following description in conjunction with the accompanying drawings, in which reference characters refer to the same parts throughout the different views. The drawings are not necessarily to scale; emphasis has instead been placed upon illustrating the principles involved. Of the drawings.

DETAILED DESCRIPTION

Figure 1:
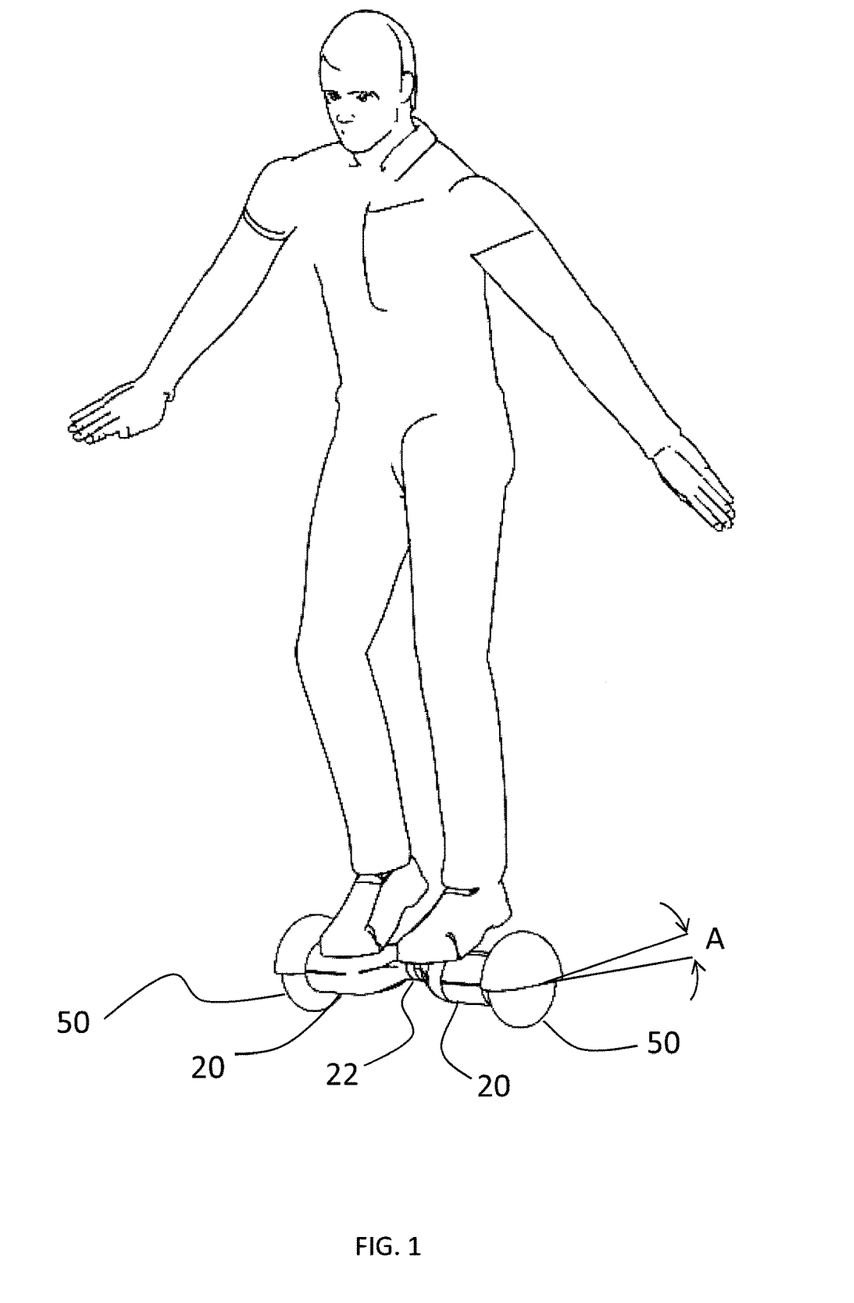
FIG. 1 illustrates an example of current hoverboard-type self-balancing scooters.

FIG. 1 is an illustration of a hoverboard-type self-balancing scooter (HSBS) such as is available from Swagway, of 3431 William Richardson Dr., Suite F, South Bend, Ind. 46628. An HSBS has two mirror-image left and right halves with each half having a respective foot platform 20, the platforms being joined at their inboard edges 22 with a rotary joint and each having a drive wheel 50 located on a common axis at their outboard edges. The left and right halves are rotationally coupled to each other to allow for their foot platforms to have a relative rotation of approximately plus or minus 5° in the forward/backwards direction. Each half of the hover board has its own drive-wheel servo feedback system. The servo system(s) are controlled by rotational inputs that the rider makes to each foot platform by tilting his or her feet forward or backwards as indicated by angle A. When the feet are tilted in unison, the HSBS moves forward or backwards in a straight line; when the feet are tilted at different angles, the HSBS turns in the direction of the less-forward-tilted foot. If the feet are tilted by the same angle but in opposing directions, the HSBS will rotate about a vertical axis. The angular velocity of the wheels is proportional to the platform tilt angle.

Figure 2:
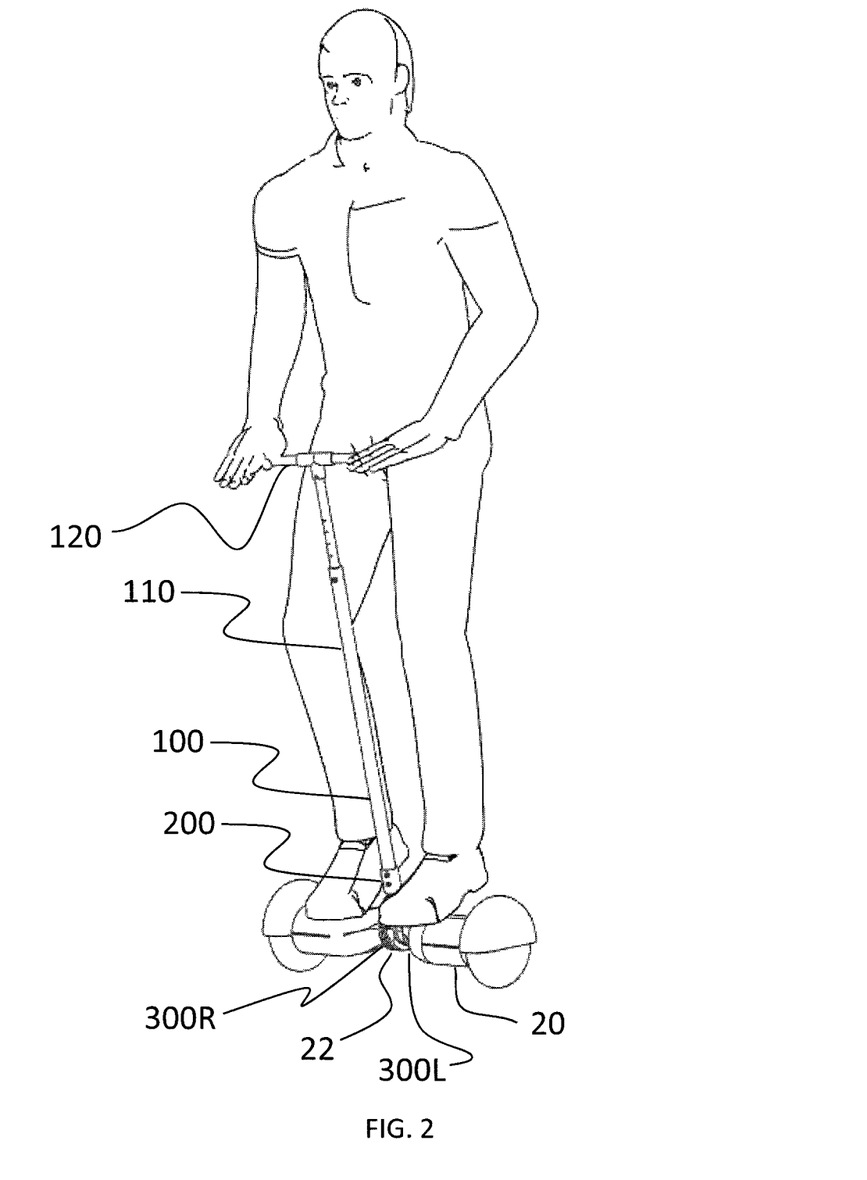
FIG. 2 illustrates a differential control apparatus installed on a hoverboard-type self-balancing scooter.

As shown in FIG. 1, a rider stands on an HSBS with one foot on each of the two foot platforms 20. Controlling the HSBS requires the ability to maintain one's feet at a desired angle while standing on two independently, rotationally unconstrained foot platforms. A differential control apparatus 10 illustrated in FIG. 2 provides a more natural and easier means for controlling the tilt angles of foot platforms 20. Control apparatus 10, in the illustrated variation, includes a rider interface control mechanism 100, which connects the rider's hands to a differential drive coupler 200, and the differential drive coupler 200, which is disposed at the common interface location of the platforms' inboard edges 22. Control apparatus 10 further includes two platform interfaces 300, which convey the motions of differential drive coupler 200 to each foot platform.

Figures 3A, 3B, 3C:
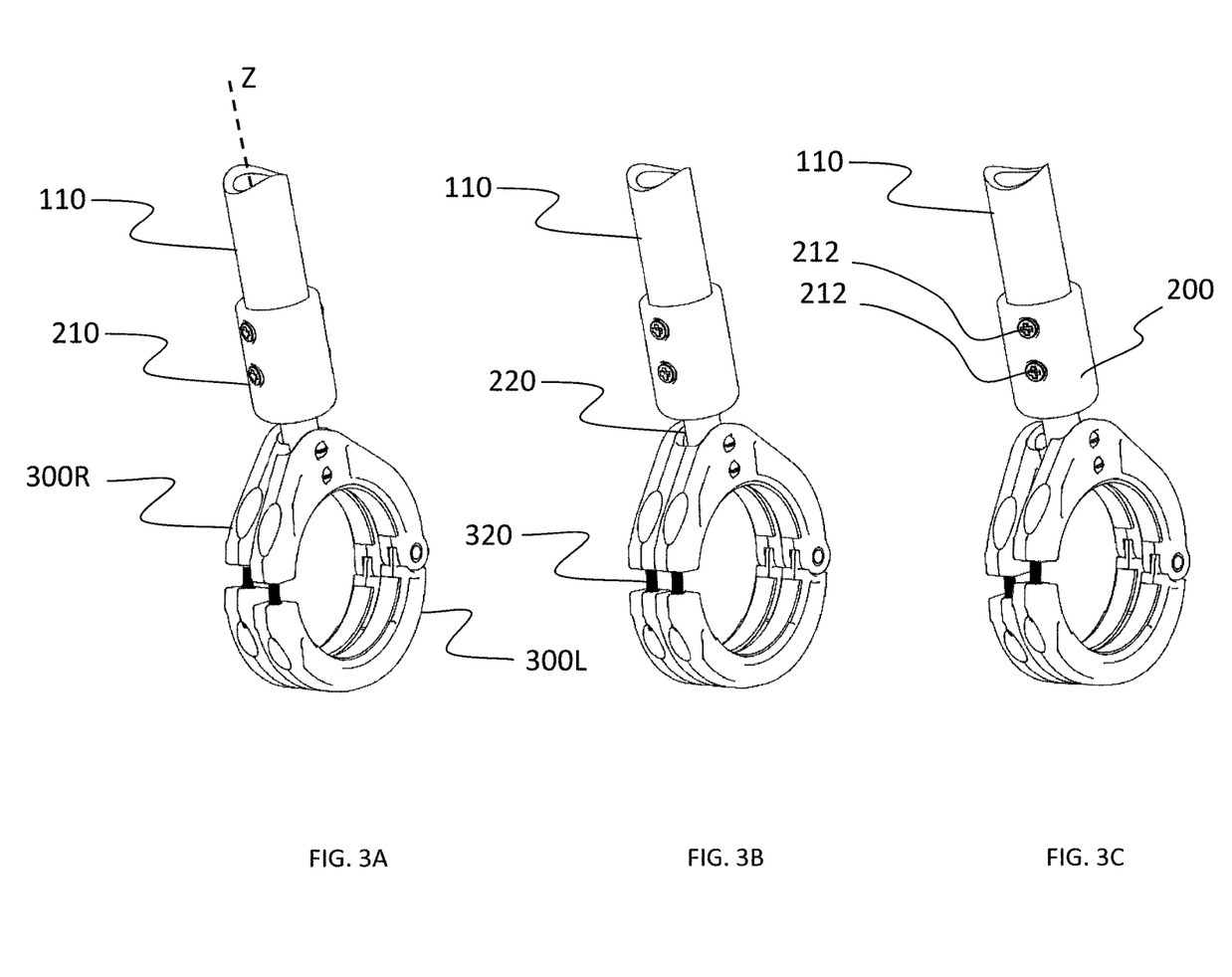
FIG. 3A is a perspective drawing of an embodiment of the differential control apparatus in a right-steering position.
FIG. 3B is a perspective drawing of an embodiment of the differential control apparatus in the neutral steering position.
FIG. 3C is a perspective drawing of an embodiment of the differential control apparatus in a left-steering position.
Figure 4:
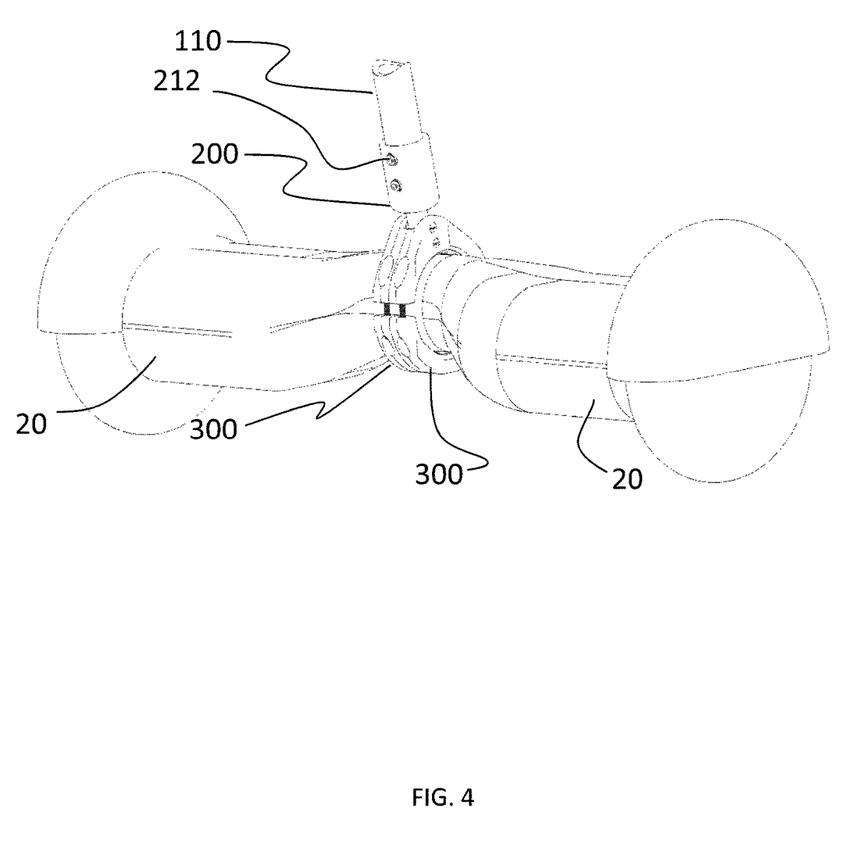
FIG. 4 illustrates a truncated view of a differential control apparatus installed on a hoverboard-type self-balancing scooter.
Figure 5:
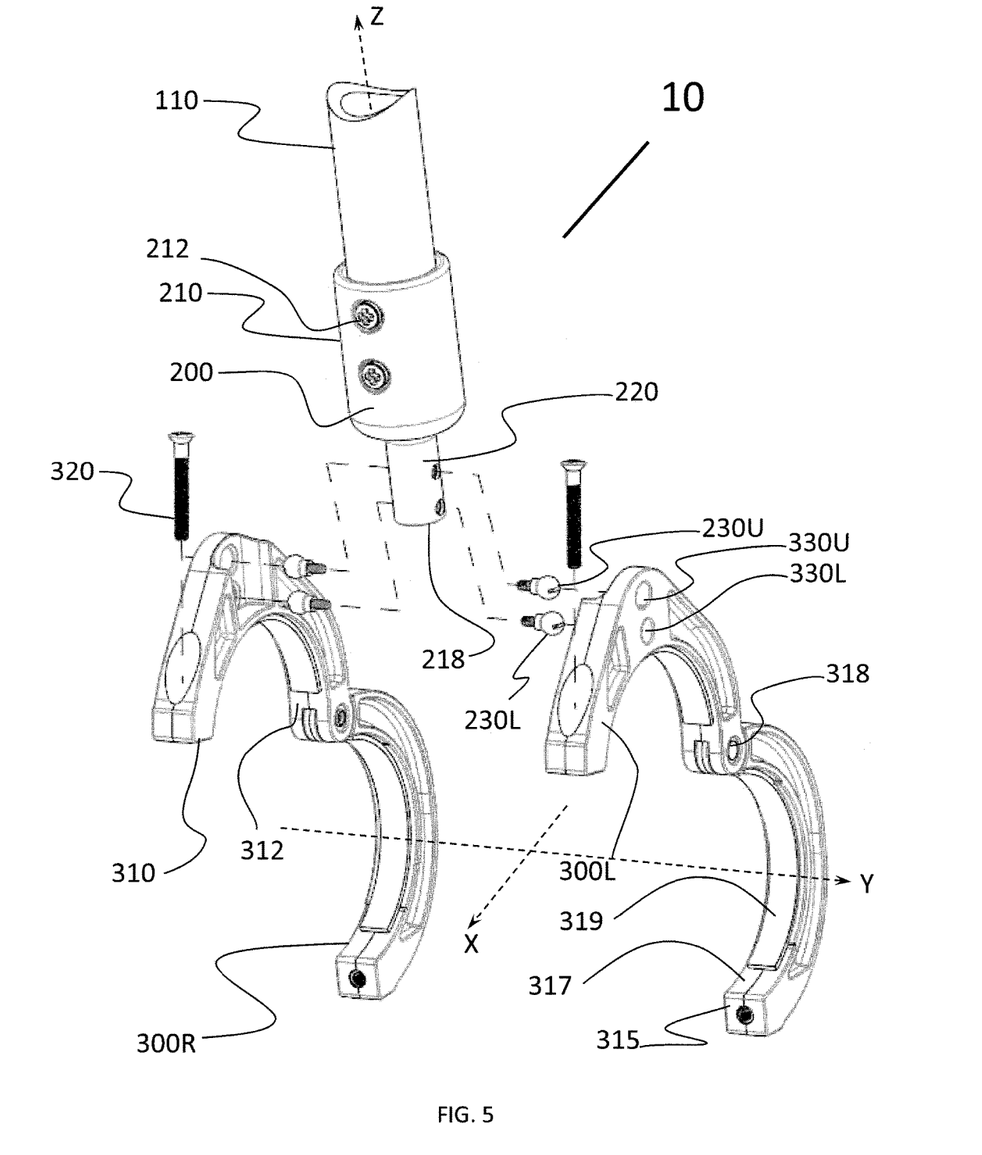
FIG. 5 is a truncated, exploded view of an embodiment of the differential control apparatus.

A truncated, perspective view of one variation of control apparatus 10 is shown in FIG. 3. FIG. 3B illustrates the control apparatus in the neutral steering position. While FIGS. 3A and 3C show it in the left and right steering positions respectively. A detail view of this variation of control apparatus 10 as installed in the vicinity of the platforms' inner edges 22 is shown in FIG. 4 and an exploded view of this variation is illustrated in FIG. 5.

In this variation, control apparatus 10 is operated by the rider using rider interface control mechanism 100. Rider interface control mechanism 100 in the illustrated variation includes an extension shaft 110 and, optionally, a cross-bar handle 120. Extension shaft 110 extends upwardly from a rider interface section 210 of differential drive coupler 200 to a convenient height for the rider. Extension shaft 110 is pushed forward to go forward, pulled backwards to go backwards, and rotated about its axis Z to steer left or right. The axis Z is also referred to herein as the "Z axis". Cross-bar handle 120 increases the rider's torque for applying rotation about axis Z. In other variations of differential control apparatus 10, different mechanisms may be used to allow the rider to manipulate differential drive coupler 200 without grasping coupler 200 directly. It will be noted that extension shaft 110 can be a separate element, as in the illustrated variation, or its function could be incorporated into drive coupler 200 by extending the length of rider interface section 210. A separate extension shaft allows the designer to select different materials for the drive coupler and the extension shaft and permits the extension shaft to be removed and re-installed to allow the HSBS to be controlled alternatively by the usual foot tilting method or by use of the differential control apparatus. A separate extension shaft also allows the differential drive augmented HSBS to be stored or transported more compactly.

Differential drive coupler 200 further includes a drive coupler section 220 which is the section of drive coupler 200 that transfers the motions of the coupler to the two platform interfaces 300, where the left-side platform interface 300L and the right-side platform interface 300R are, in most variations, mirror images of each other matching the typical mirror image designs of the foot platforms. In the illustrated variation, drive coupler section 220 includes a cylindrical body 218 disposed coaxially with extension shaft 110 and between the left platform interface 300L and the right platform interface 300R. Drive coupler section 220 further includes upper drive appendages 230U and lower drive appendages 230L that extend radially outwardly from cylindrical body 218. Drive appendages 230 transfer the motions of differential drive coupler 200 to the foot platforms 20 through the platform interfaces 300.

As illustrated, differential drive coupler 200 is disposed between the left and right platform interfaces and includes at least one drive appendage 230 directed toward the left and right foot platform respectively. Each platform interface 300 has one or more drive appendage seats 330 designed to engage the one or more drive appendages 230 such that a rotary motion of differential drive coupler 200 about an axis parallel to a nominal Z axis is converted into foot platform rotation about a Y axis that is parallel to the axis of rotation of the foot platforms.

As shown in FIGS. 3, 4, and 5, in one variation the differential control apparatus 10 is designed as an aftermarket accessory that may be attached to an HSBS such as manufactured by multiple manufacturers. In one variation, platform interfaces 300 include a clamping mechanism that allows the right and left platform interfaces to be firmly attached to the appropriate foot platforms. For example, as illustrated in the exploded view of FIG. 5, a differential control apparatus 10 designed for an HSBS having foot platforms 20 that are cylindrical at their inboard edges 22 has platform interfaces 300 each having a clamp with two substantially semi-circular portions. An upper clamp portion 310 incorporates the drive appendage seats 330U, 330L and is a generally arcuate half-ring with a curved inner surface 312 matched to the radius of the foot platform at its inboard edge 22. Similarly, a lower clamp portion 315 is an arcuate half-ring with the same inner radius surface 317. The two clamp portions are attached to each other by a hinge 318. The two clamp portions, when open, may be fitted around the inner edge 22 of foot platform 20, after which they are closed around the foot platform and locked together by a fastening mechanism The locking mechanism may be, for example, a machine bolt 320 as shown in FIG. 4. In some embodiments the inner surfaces 312, 317 of the clamp portions are lined with a padding material 319 which may both protect the surface of the HSBS from being marred and may increase the friction between the clamp portions and the HSBS, reducing the compressional force required to keep the platform interfaces from slipping inside the clamp portions.

Figure 6:
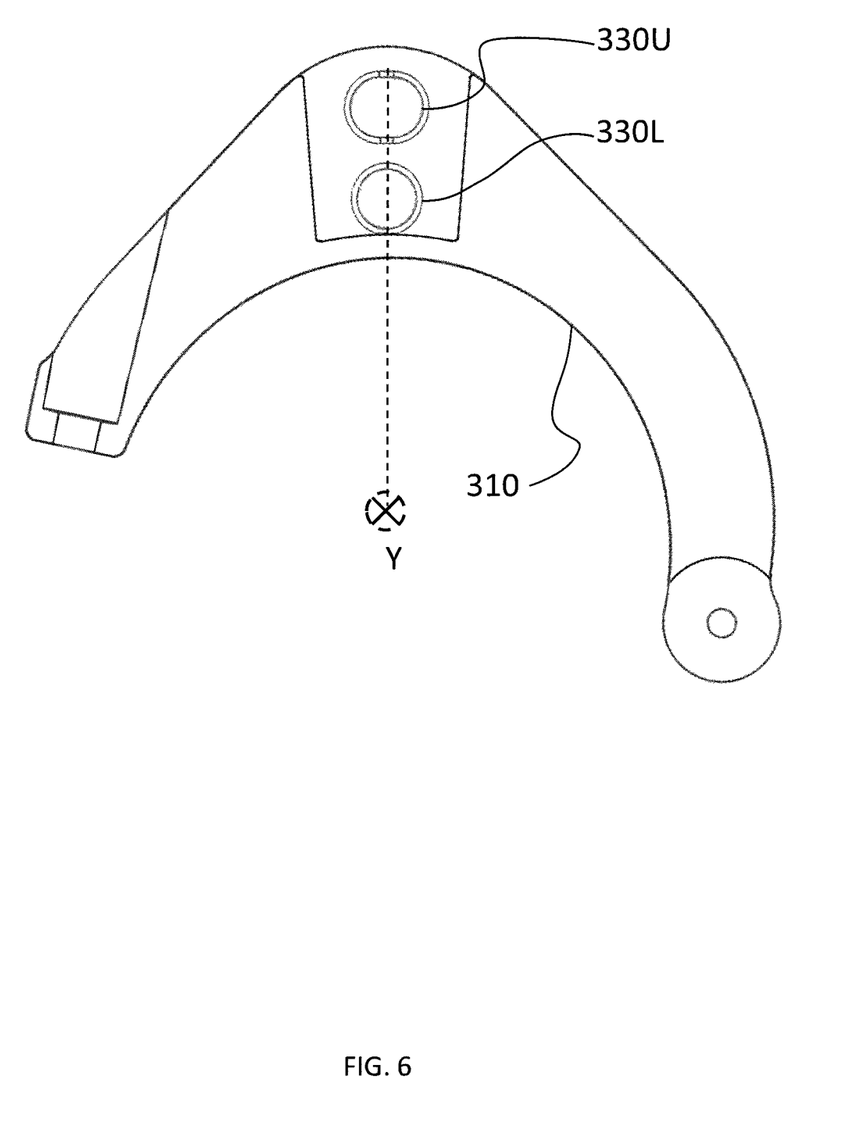
FIG. 6 is a cross-section view of an embodiment of an upper clamp portion.

The cutaway side view shown in FIG. 6 illustrates one variation of upper clamp portion 310. A function of upper clamp portion 310 is to properly locate the one or more drive appendage seats 330 to engage drive appendages 230 to transfer the motions of the differential drive coupler to the foot platform. The illustrated variation, as discussed above, includes two drive appendage seats; an upper appendage seat 330U and a lower appendage seat 330L. It will be noted that one seat, in this example lower appendage seat 330L, is circular in cross-section while the other, in this case upper appendage seat 330U, is generally oval in cross-section.

This oval shape accommodates the greater circumferential motion of seat 330U (relative to seat 330L) when upper clamp portion 310 rotates about a Y axis shown as extending into the plane of FIG. 6. Alternatively, upper seat 330U may be circular and lower seat 330L may be oval. As will be discussed below, this oval shape may produce a "dead band" in speed control.

Figure 7A:
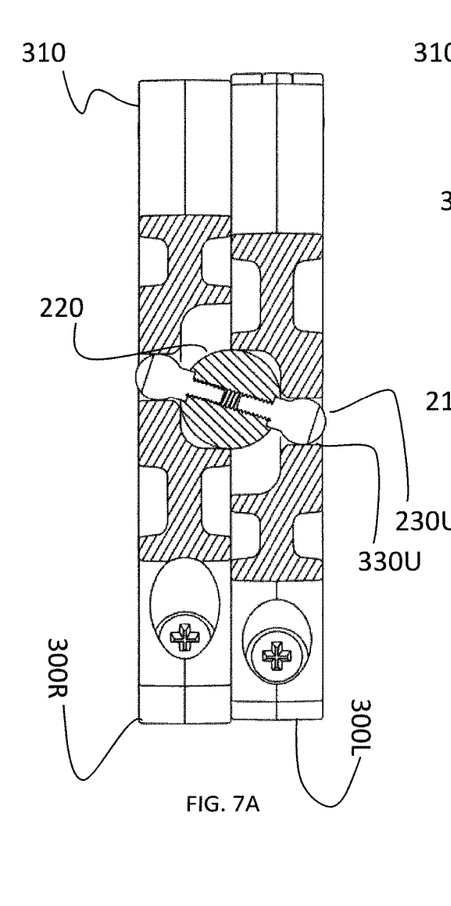
FIGS. 7A-7C are sectional views illustrating a differential control apparatus in a right-, neutral-, and left-steering position respectively.
Figures 7B, 7C:
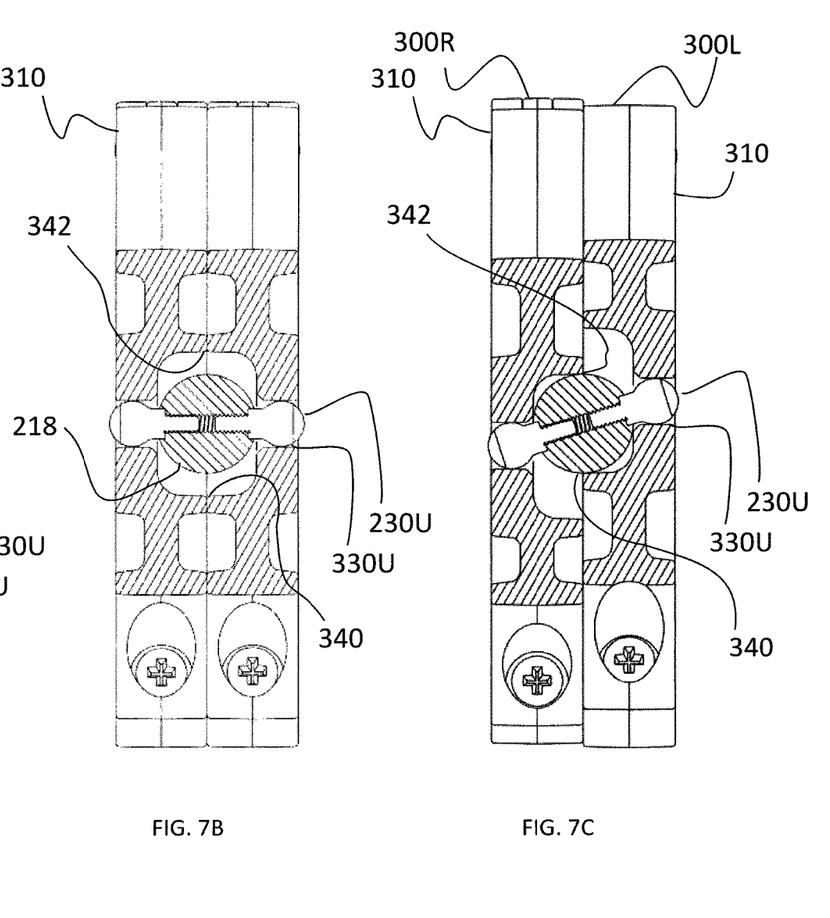

One motion transferred from drive coupler 200 to the foot platforms through the platform interfaces 300 is the Z-axis rotation of the drive coupler that is converted to the differential forward-backwards pitch motion (viz., motion about the Y axis) of the foot platforms. This pitch motion is used to steer the HSBS. As was noted above, it is the difference in foot platform pitch that steers the HSBS while the average pitch determines its speed, forward or backward. Sectional views in FIGS. 7A-7C illustrate for one embodiment how Z-axis rotation of drive coupler 200 is converted into pure differential pitch of foot platform interfaces 300R, 300L, where "pure differential pitch" means interface 300R and 300L pitch by an equal amount but in opposing senses. FIG. 7B shows the apparatus in the neutral or non-turning condition while FIGS. 7A and 7C show the apparatus in the right-turning and left-turning conditions respectively.

As shown in FIG. 7B, in the non-turning condition lower drive appendages 230L are aligned parallel to the Y axis, forcing platform interfaces 300R, 300L to be similarly aligned, that is, being at equal pitch angles. In FIG. 7A drive coupler section 220 has been rotated about the Z axis to dispose the right side drive appendage behind (that is, at a negative X position) the neutral position of FIG. 7B and to dispose the left side drive appendage ahead (positive X position) of the neutral position of FIG. 7B. Because the platform interfaces are coupled to their respective appendages, FIG. 7A shows the corresponding features of interfaces 300R and 300L displaced accordingly.

The embodiment illustrated in FIG. 7 may further include an integral rotation limit. Drive coupler section 220 is designed to fit in a pocket formed by a pair of open regions in the platform interfaces. In the sectional views in FIG. 7 the edges of this pocket are visible as a leading edge 340 and a trailing edge 342. When the HSBS is in the non-turning condition, as shown in FIG. 7B, neither leading edge 340 nor trailing edge 342 is in contact with drive coupler section 220. As the rider initiates a turn, the two halves of the pocket become displaced from each other such that the leading edge of one half of the pocket and the trailing edge of the other half of the pocket begin to move toward drive coupler section 220. The tightest turning radius allowed by the design is achieved when the two edges of the pocket reach interface section 220. As illustrated in FIG. 7C for a left hand turn, the minimum turning radius is achieved when lead edge 340 of the pocket in left platform interface 300L touches drive coupler section 220. By symmetry, the trailing edge of the pocket in right platform interface 300R touches drive coupler section 220 at the same time.

In the illustrated variation, another motion transferred from drive coupler 200 to the foot platforms through the platform interfaces 300 is rotation of the drive coupler 200 around the Y axis to effect velocity (that is, speed and direction) control. Rotation of drive coupler 200 around the Y axis is typically accomplished by displacing the top of rider interface control mechanism 100, that is, the top of extension shaft 110, forward or backward from its neutral position. That motion is converted to a simultaneous forward or backward pitch motion (viz., motion about the Y axis) of both foot platforms, driving the HSBS forward or backward. The successful transfer of the forward/backward extension shaft 110 motion to the platform interfaces 300 requires a substantially rigid connection between shaft 110 and interfaces 300 in the X-Z plane. In the embodiment presented above, that substantially rigid connection is provided by incorporating a second drive appendage (in this variation upper drive appendage 230U) and upper drive appendage seat 330U into each side of the apparatus. It will be clear to one of ordinary skill in the mechanical arts that drive coupler 200 is constrained in the X-Z plane by a pair of appendages/appendage seats linearly displaced from one another in that plane.

As was noted above, as shown in FIG. 6, upper drive appendage seat 330U is oval, not round like lower drive appendage seat 330L. In this variation the upper seat is elongated into a generally oval shape to account for the greater circumferential distance travelled by upper seat 330U, compared to lower seat 330L, when upper clamp portion 310 rotates about the Y axis. It will be noted that, in this variation, drive coupler 200, and by extension rider interface control mechanism 100, when in the neutral steering position, may be rocked forward or rearwards by several degrees without imparting any change of tilt to the two foot platforms.

The differential control apparatus 10 discussed above is configured to be an aftermarket accessory for an HSBS that can be installed by the end-consumer. For example, the consumer can clamp, for example, the left platform interface 300L onto the left foot platform 20, attach the differential drive coupler 200 by inserting either set of drive appendages 230 into the appendage seats in the left platform interface, and then lock the drive coupler 200 in place by installing the right platform interface 300R over the protruding second set of drive appendages 230 and tightening the clamping mechanism around the right foot platform 20R. Installation is completed by inserting control extension shaft 110 into rider interface section 210 and tightening one or more locking screws 212. Removal of the apparatus 10 merely involves reversing these steps, leaving the HSBS in its initial condition.

Figure 8A:
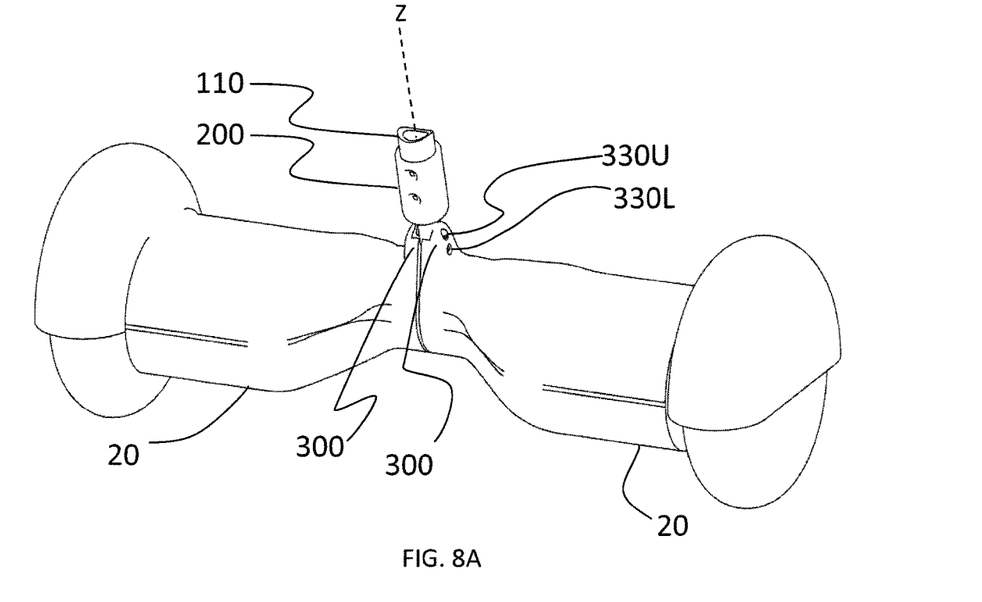
FIG. 8A-8B are perspective illustrations of a second embodiment of a differential control apparatus.

In another variation the differential control apparatus 10 can be configured to be an integral component of the HSBS by the manufacturer. As illustrated in FIG. 8A and exploded view FIG. 8B, the integral version of differential control apparatus 10 includes platform interfaces 300 that are built directly into foot platforms 20. The differential drive coupler 200 used in an integral differential control apparatus 10 is in all respects equivalent to the differential drive coupler discussed above. For example, in the variation shown in FIG. 8B the drive coupler 200 includes cylindrical body 218 having attached thereto two sets of drive appendages 230 and rider interface section 210 into which extension shaft 110 is inserted. Platform interfaces 300, in lieu of being clamped in place by upper clamp portion 310 and lower clamp portion 315, are instead molded directly into foot platforms 20. The functionality of the upper clamp portion is provided by an upward directed molded projection having the requisite drive appendage seats 330 to match drive appendages 230.

In one variation of drive coupler 200 the drive appendages are cast in place or otherwise permanently attached to cylindrical body 218. This variation provides a strong apparatus well suited to withstanding the forces required to tilt foot platforms 20 when they are carrying the weight of a rider. However, a drive coupler with permanently in place drive appendages cannot be removed easily from between the two platform interfaces 300 without either separating the platform interfaces or modifying (and thereby complicating)

the platform interfaces by including some movable or removable sections to allow the drive appendages to escape the drive appendage seats, typically in an upward (Z-axis) direction.

Figure 9:
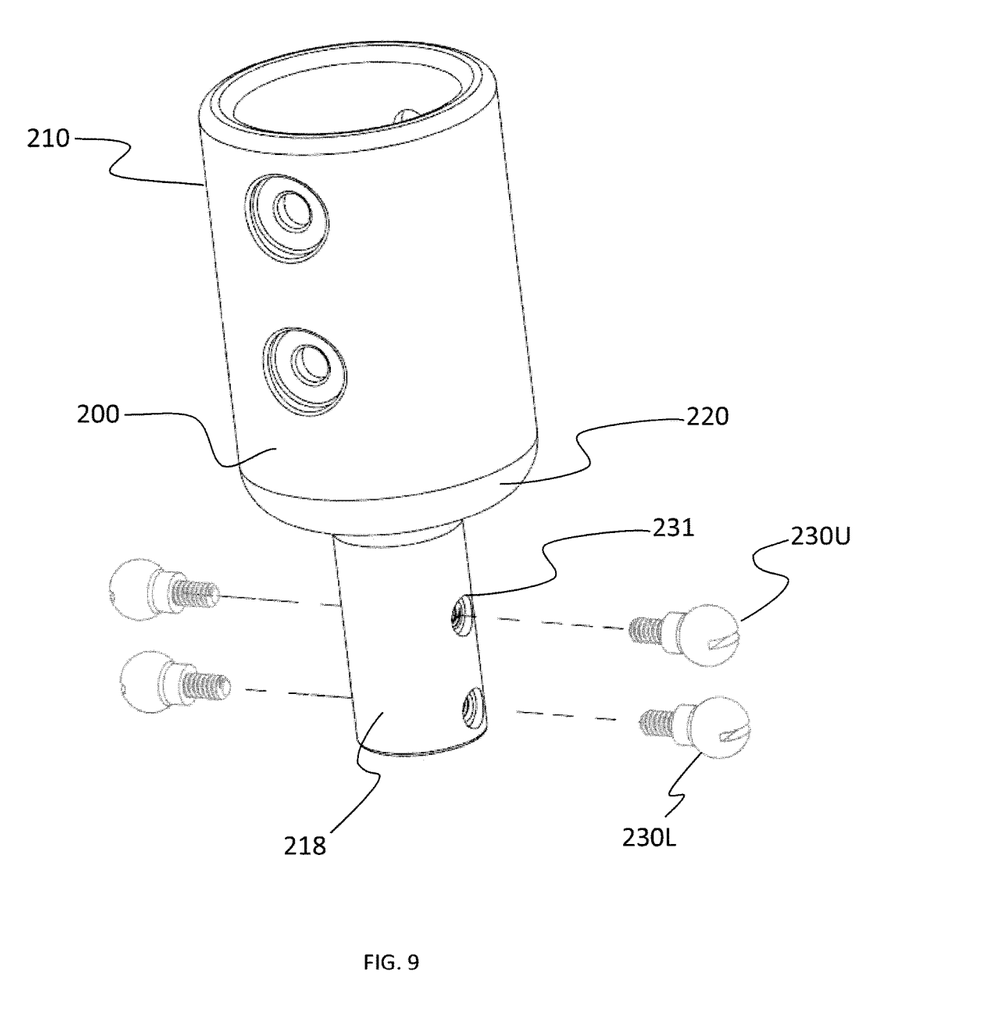
FIG. 9 is an exploded view of a differential drive coupler having removable drive appendages.

Another variation of drive coupler 200 provides an alternative means to allow the drive coupler to be removed from between the platform interfaces. As illustrated in close-up FIG. 9, cylindrical body 218 may include threaded attachment points 231 designed to accept threaded drive appendages 230. The spherical ends of the threaded drive appendages are adapted to allow the drive appendages to be screwed in or out of attachment points 231 by, for example, incorporating a slot for a chisel blade screwdriver or a hexagonal hole matching a standard Allen wrench size.

Figure 8B:
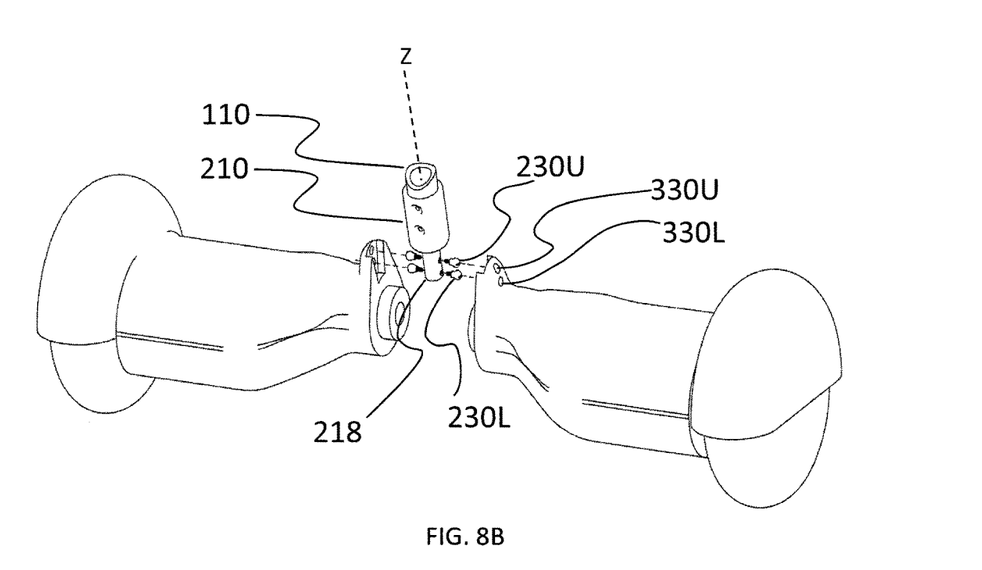

This variation of drive coupler 200 may be removed from between fixed platform interfaces such as are illustrated in FIG. 8 if the platform interfaces include appendage seats that provide clearance for the spherical ends to pass. For example, as shown in FIG. 7B, drive appendage 230U is screwed into cylindrical body 218 while its spherical head is disposed in appendage seat 330U. As is illustrated, appendage 230U may be unscrewed from body 218 and will pass unimpeded through seat 330U.

Figure 10:
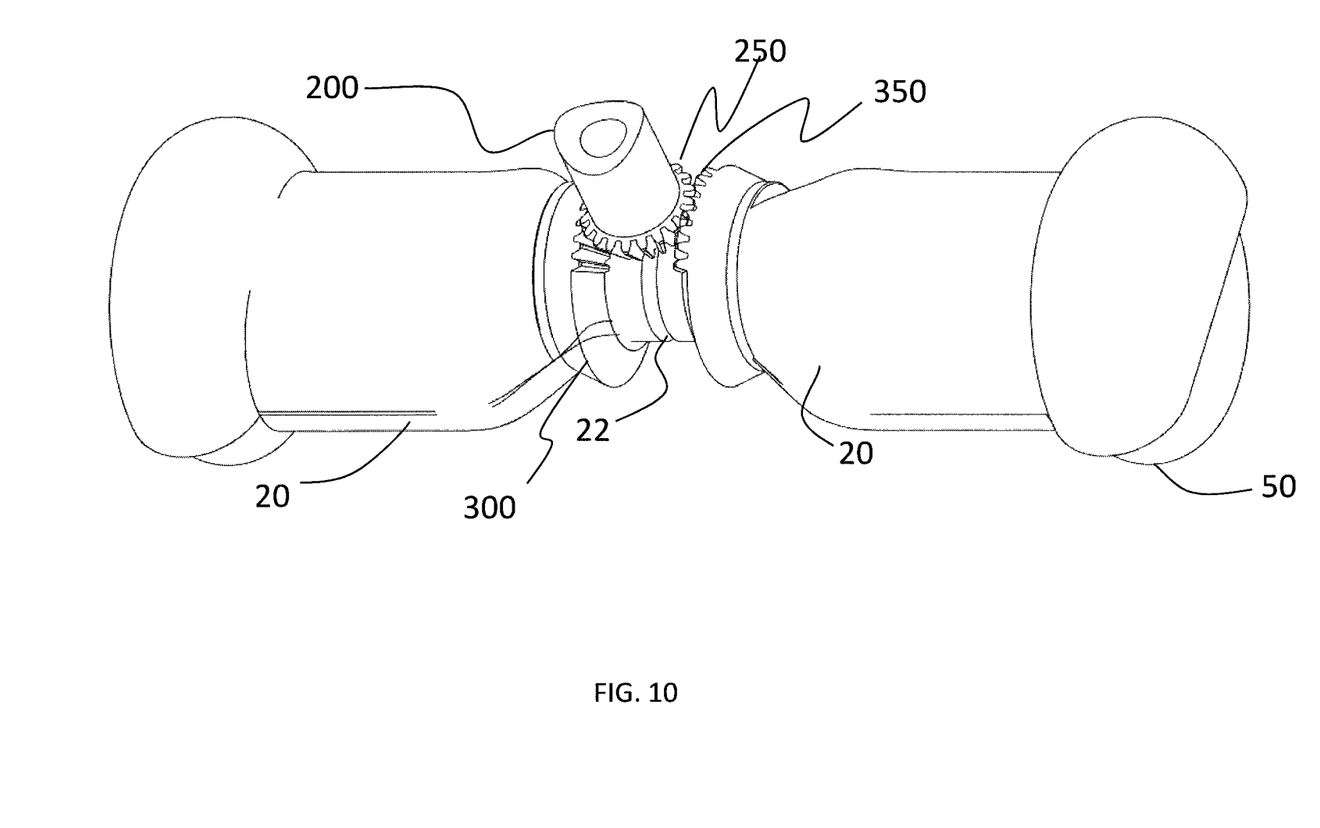
FIG. 10 is a perspective view of a third embodiment of the differential control apparatus.

FIG. 10 illustrates an alternative embodiment for the differential drive coupler and foot platform interface(s) which uses matching beveled gears to achieve differential function. That is, rotating coupler 200 clockwise causes the left foot platform to rotate downwards and the right foot platform to rotate upwards, steering the HSBS to the "right", or clockwise, as would be expected and pushing coupler 200 fore and aft causes both foot platforms to rotate downwards or upwards appropriately. As illustrated, this embodiment includes a bevel gear 250 mounted at the end of drive coupler section 220 and two beveled gears 350 affixed to the left and right foot platforms 20, where they function as at least one a part of the platform interfaces 300. Note that this embodiment requires a means of coupler vertical stabilization to hold the coupler (and extension shaft 110) from rotating unconstrained in the X-Z plane, a rotation that is used to control the velocity of the HSBS.

In some variations of a beveled-gear differential drive coupler, vertical stabilization is provided by adding a pair of drive appendages 230U to coupler 200, displaced along the Z axis from beveled gear 250, along with a matching set of appendage seats 330U on an extended section of a platform interface 300, where the "U" or "Upper" designation has been retained to indicate that the appendages and seats are displaced in the positive Z-direction from the bevel gears 350.

As was discussed above in relationship to FIGS. 5 and 6 and noted with regard to the variation in FIG. 10, drive coupler 200 vertical stabilization can be accomplished using a set of drive appendages and appendage seats displaced in the Z-direction from the primary differential drive connection between drive coupler 200 and platform interfaces 300. As was noted, the variation disclosed in that discussion uses a substantially oval appendage seat to avoid over constraining the motion of the second drive appendage. The oval appendage seat does create a small control "dead band" wherein extension shaft 110 can move fore and aft without affecting the velocity of the HSBS. In some situations this dead band may be undesirable, in which case alternative stabilization variations may be utilized. For example, as shown in FIG. 11, a stabilization bushing 245 may be installed on cylindrical body 218 to constrain drive coupler 200 relative to platform interfaces 300 in the fore-aft direction only.

Stabilization bushing 245 includes an annulus that surrounds cylindrical body 218 and a pair of stabilization appendages 240 which may be substantially identical to drive appendages 230 or may be simple rods, as illustrated, extending radially from bushing 245. Stabilization appendages 240 are inserted into matching appendage seats 331U whose design will follow from their usage. For example, as shown in FIG. 11, when appendages 240 are substantially rods, appendage seats 331U are frustrated conical holes wherein the holes taper outwardly between the inward face of upper clamp portion 310 and the exterior face of upper clamp portion 310. As shown in FIG. 11 bushing 245 is unconstrained along the Z axis. In some variations it is desirable to use this bushing to limit the Z-axis motion of the rider interface control mechanism 100, that is, to hold the control mechanism in place. In such variations a retaining snap ring may be installed around cylindrical body 218, directly below the nominal position of bushing 245, thereby limiting drive coupler 200 from pulling up and away from the platform interfaces.

Figure 11:
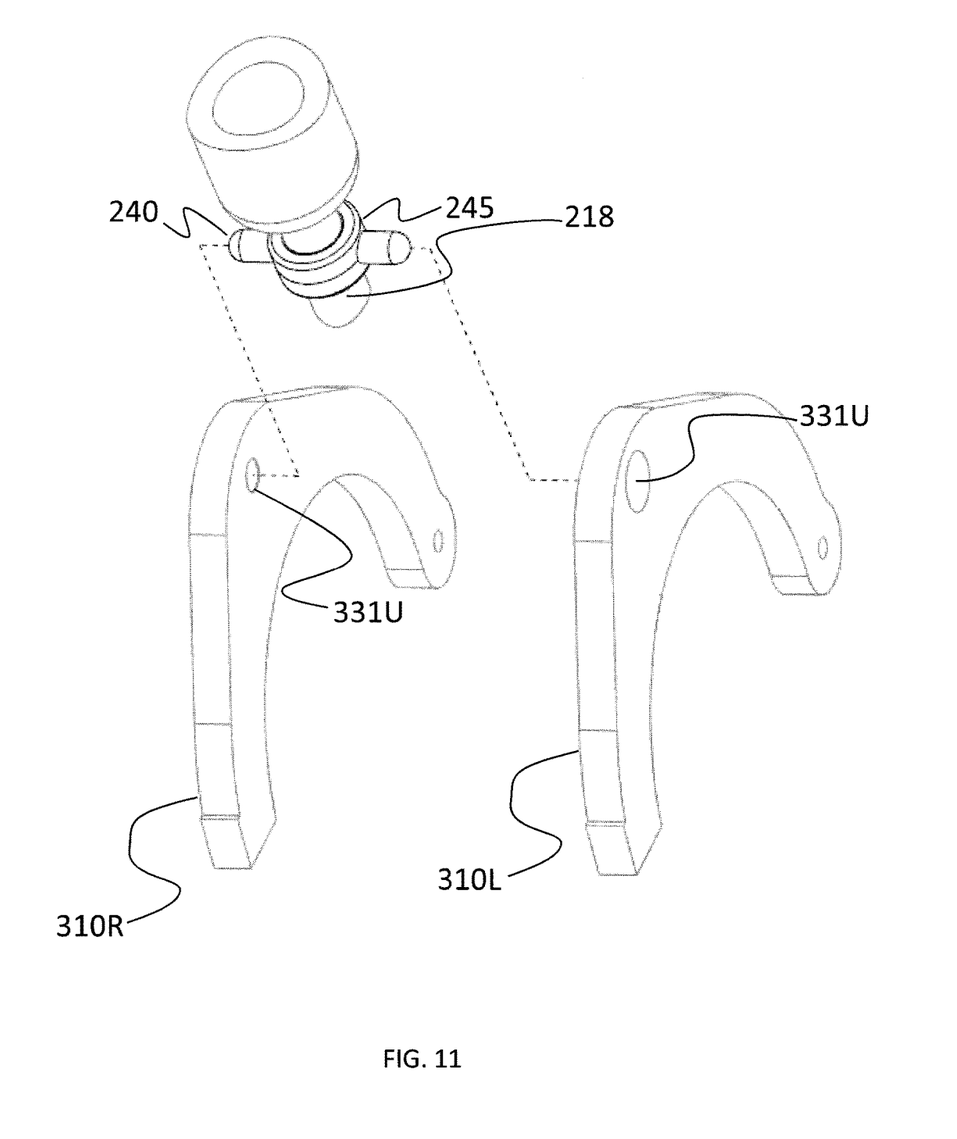
FIG. 11 is s a partially exploded view of a coupler stabilization embodiment.

It should be noted that cylindrical body 218 is truncated in FIG. 11; the extended portion of cylindrical body 218 could have, for example bevel gear 250 or another pair of drive appendages 230 attached. Similarly, upper clamp portions 310 are illustrated with just one set of appendage seats to focus on the stabilization function being illustrated.

Figure 12:
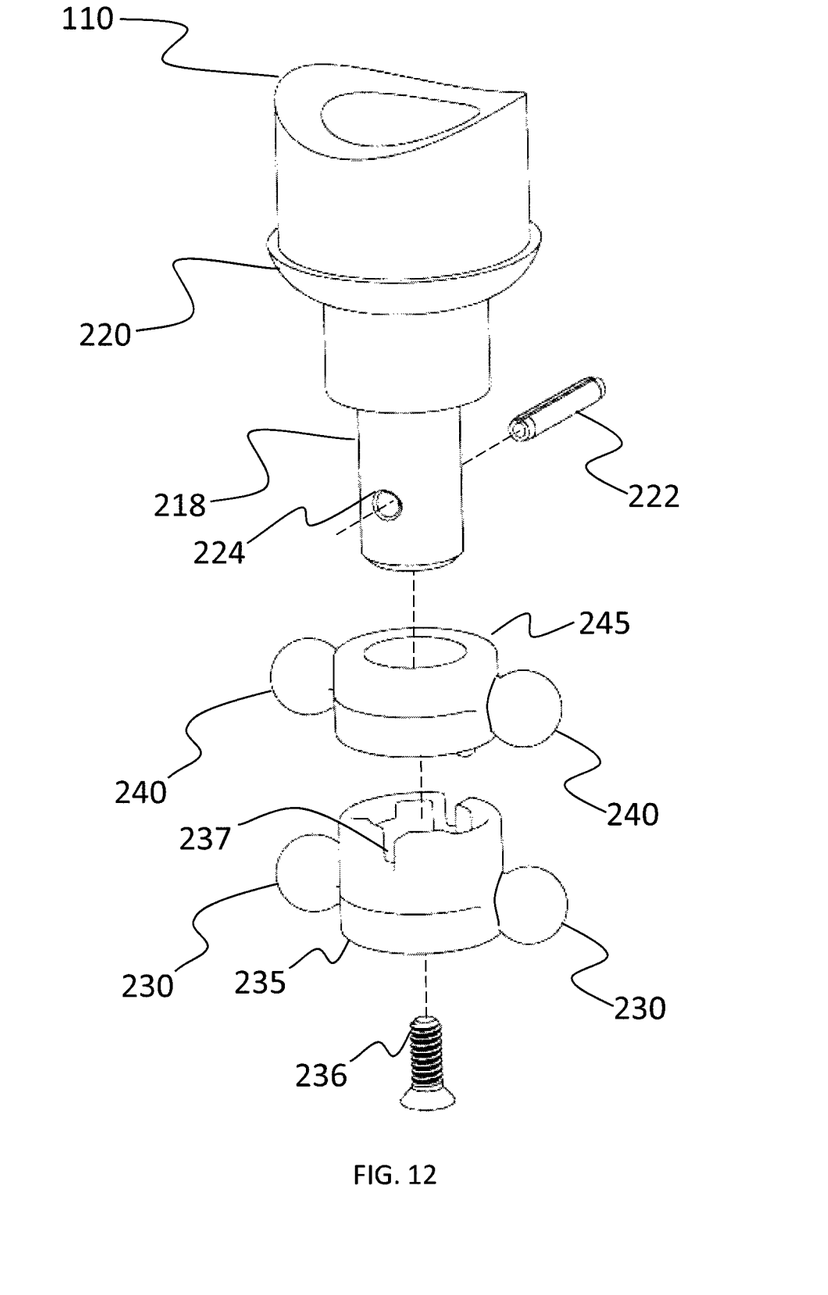
FIG. 12 is an exploded view of a coupler stabilization variation combined with a differential drive coupler.

FIG. 12 shows another embodiment of the stabilization bushing variation. In this variation drive appendages 230 are attached to an appendage cup 235 which is locked to cylindrical body 218 in rotation by a roll pin 222 and kept attached to cylindrical body 218 by screw 236. Stabilization appendages 240 are affixed to bushing 245, which is free-floating on body 218. The upper and lower appendage seats 330 can now both be round (that is, fabricated identically as drilled holes) since any differential motions between the upper and lower appendage seats are accommodated by the unconstrained stabilization bushing, as is discussed below.

It will be noted that one effect of the appendages travelling in their arcs about the Z axis is that they move in and out of the X-Z plane of the appendage seats; this motion is easily accommodated by making the seats simple drilled cylindrical holes. Similarly, the effect of the appendage seats travelling in their arcs about the Y axis is that the seats move up and down by a small amount in the X-Z plane. This motion can be ignored when there is only one set of appendages since that one set of appendages, along with the cylindrical body to which they are attached, can move "up and down", that is, toward and away from the Y axis, with the appendage seat, eliminating any binding. Further, the distances up and down that the rider interface control mechanism travels during steering an HSBS can easily be calculated to be too small to be felt by a rider as he or she twists the rider interface control mechanism 100.

On the other hand, when two sets of appendages are used, as they are in the variations of FIGS. 12-13, the differential up and down motion between upper appendage seat 330U and lower appendage seat 330L can result in the appendages binding in the appendage seats unless some additional relief is provided, as described below.

Figure 13:
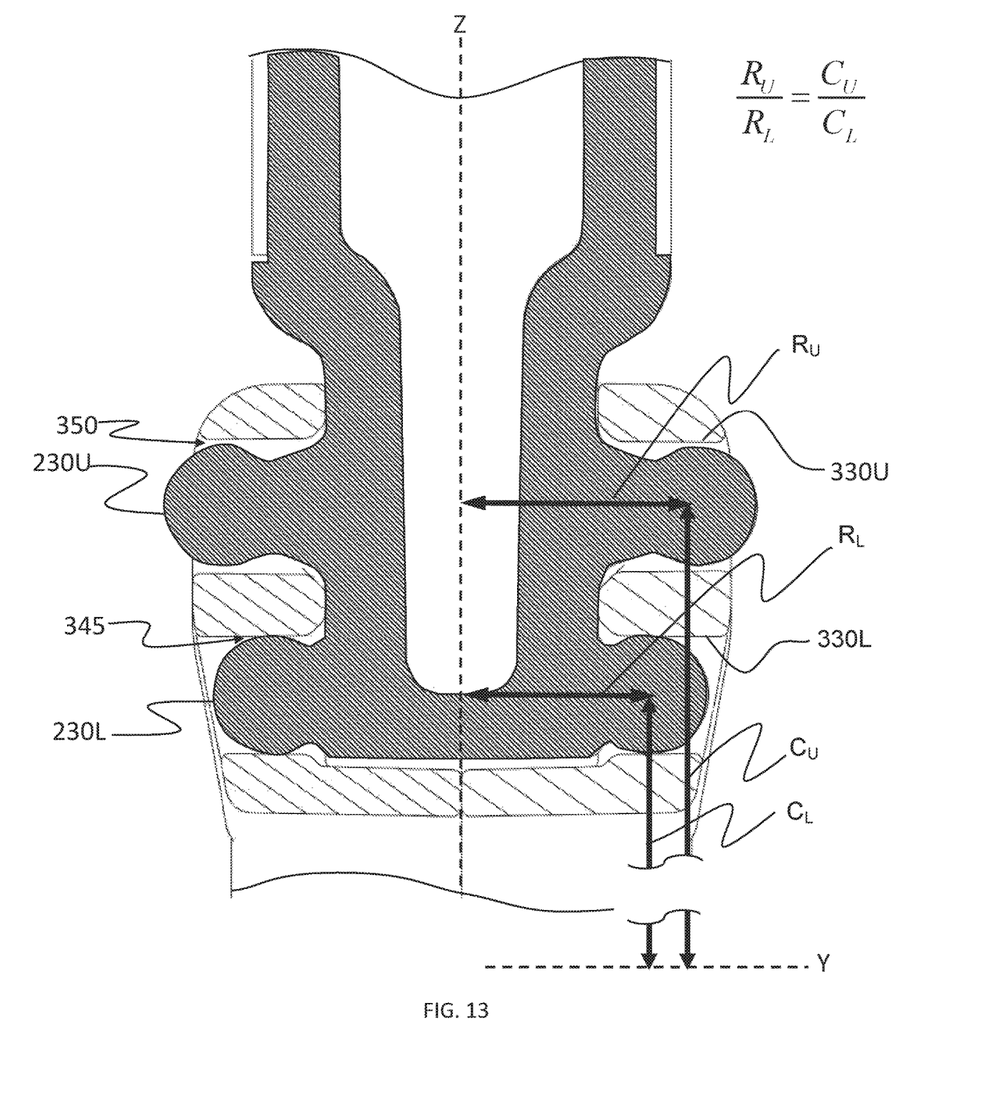
FIG. 13 is a sectional view of a coupler stabilization embodiment integrated within the differential drive coupler.

FIG. 13 illustrates a cross-sectional view of another variation of the use of a second set of appendages to stabilize the rider interface control mechanism. In this variation the extra manufacturing complexity of a stabilization bushing and an appendage cup as was illustrated in FIG. 12 is eliminated. Mechanical engineering analysis shows that the tangential distances traversed by the upper and lower appendages when they are rotated about the Z axis at radii $R_U$, $R_L$ are proportional to the tangential distances traversed by their respective upper and lower appendage seats as they are rotated about the Z axis at radial heights $C_U$ and $C_L$ respectively. That is, the loci of travel in the X-Y plane of the upper and lower appendages and the upper and lower appendage seats will be substantially identical if the condition $$\frac{R_U}{R_L} = \frac{C_U}{C_L}$$

is met. The small differences in these loci of travel that result from the appendages travelling in arcs about the Z axis while the appendage seats are travelling in arcs about the Y axis are compensated as described above for a single appendage for motions in and out of the X-Z plane. As is clear from basic geometry, the differential "up and down" motion, $\Delta Z$, of the appendage seats is $$(C_U - C_L)*(1 - \cos(\theta))$$

where $\theta$ is the angle of rotation of the foot platform. This small amount of differential motion would be enough to bind the appendages if both appendage seats were machined to be a close fit to their respective appendages. To avoid this issue, as illustrated in FIG. 13, in one variation lower appendage seats 330L can be matched with a close manufacturing tolerance 345 to the radius of lower appendages 230L; the tolerance 0.0005" minimum to 0.0045" maximum radial clearance to eliminate any perceived "sloppy" feel in the up-and-down direction while the upper appendage seats 330U have enough clearance 350 to accommodate $\Delta Z$ with some additional manufacturing tolerance on the order of clearance 345.

In one alternative, the platform interface could be screwed into top surface of foot platform instead of being clamped around, or the rider interface control mechanism can be at an outboard edge of foot platform and connected to central drive coupler section by parallelogram linkages running under the feet.

The devices and systems described above are provided as non-limiting examples of details of construction and arrangement of components. There may be variations of devices, systems and methods that are capable of other embodiments and of being practiced or of being carried out in various ways. For example, platform interface 300 may be screwed into the top surface of foot platform 20 instead of being clamped around the platform. Further, for example, rider interface control mechanism 200 can be attached at an outboard edge of foot platform and connected to central drive coupler section 220 by parallelogram linkages running under the feet Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

What is claimed is:

1. A differential control apparatus for a self-balancing scooter, comprising:
    a first platform interface configured to be rigidly connected to a first foot platform of the self-balancing scooter;
    a second platform interface configured to be rigidly connected to a second foot platform of the self-balancing scooter;
    a differential drive coupler mechanically coupled to the first platform interface and the second platform interface to impart differential rotational motion thereto in response to a mechanical control input; and
    a rider interface control mechanism connected to the differential drive coupler to supply the mechanical control input in response to user control actions to control movement of the self-balancing scooter in operation,
    wherein the differential drive coupler includes (i) a drive coupler section disposed between the first and second platform interfaces, and (ii) a rider interface section projecting outwardly from the first and second platform interfaces, the rider interface section pointed in a generally upward direction perpendicular to a common axis of rotation of the first and second foot platforms.

2. The differential control apparatus of claim 1, wherein the first and second platform interfaces are configured to be detachably connected to the first and second foot platforms respectively at respective central and abutting edges.

3. The differential control apparatus of claim 2, wherein the first and second platform interfaces include respective clamping mechanisms by which the first and second platform interfaces are firmly attached to the respective foot platforms.

4. The differential control apparatus of claim 3, wherein the first and second foot platforms have cylindrical inboard portions and the first and second platform interfaces each has a respective clamp with two hingedly attached clamp portions, each clamp portion being a generally arcuate half-ring with a curved inner surface matched to a radius of the cylindrical inboard portion of the respective foot platform, the clamp portions of each clamp configured to be locked together by a fastening mechanism when attached to the respective foot platforms.

5. The differential control apparatus of claim 1, wherein the rider interface control mechanism includes an elongated stick extending upwardly from the rider interface section and having a user-operable handle by which the user control actions are received.

6. The differential control apparatus of claim 1, wherein the differential drive coupler comprises a pair of drive appendages diametrically disposed to project radially into matching appendage seats in each of the first and second platform interfaces.

7. The differential control apparatus of claim 6, wherein a vertical stabilization of the differential drive coupler is provided by a second pair of drive appendages, along with a matching set of appendage seats on an extended section of each of the first and second platform interfaces, wherein the second pair of drive appendages are displaced in a generally perpendicular direction to a common axis of rotation of the first and second foot platforms.

8. The differential control apparatus of claim 7, wherein an upper one of the appendage seats is substantially oval to avoid over-constraining motion of the respective drive appendage.

9. The differential control apparatus of claim 7, wherein a vertical stabilization is provided by maintaining a ratio of a radial length of an upper appendage to a radial length of a lower appendage wherein the ratio is equal to the ratio of the respective distances of the upper and lower appendages from a common axis of rotation of the first and second foot platforms.

10. The differential control apparatus of claim 1, wherein the differential drive coupler comprises an arcuate section of a gear disposed to mesh with matching arcuate sections of gears disposed on each of the first and second platform interfaces.

11. The differential control apparatus of claim 1, wherein a vertical stabilization is provided by a stabilization bushing on a cylindrical body of the differential drive coupler to constrain motion of the differential drive coupler relative to the platform interfaces in a fore-aft direction only, the stabilization bushing including an annulus surrounding the cylindrical body and a pair of stabilization appendages inserted into matching appendage seats of the platform interfaces.

12. The differential control apparatus of claim 1, wherein a vertical stabilization is provided by a set of drive appendages attached to an appendage cup which is locked to a cylindrical body of the differential drive coupler in rotation, and a set of stabilization appendages affixed to a stabilization bushing free-floating on the cylindrical body.

13. The differential control apparatus of claim 1, wherein the rotational motion imparted by the differential drive coupler includes (i) rotating the first and second foot platforms equally in opposing directions about a Y axis extending between first and second wheels of the self-balancing scooter in response to rotation of the differential drive coupler about a Z axis perpendicular to the Y axis, and (ii) rotating the first and second foot platforms equally in a same direction in response to rotation of the differential drive coupler about the Y axis.

14. A self-balancing scooter, comprising:
a self-balancing scooter, said scooter having a first foot platform and a second foot platform; and
a differential control apparatus having:
a first platform interface rigidly connected to the first foot platform of the self-balancing scooter;
a second platform interface rigidly connected to the second foot platform of the self-balancing scooter;
a differential drive coupler mechanically coupled to the first platform interface and the second platform interface to impart differential rotational motion thereto in response to a mechanical control input; and
a rider interface control mechanism connected to the differential drive coupler to supply the mechanical control input in response to user control actions to control movement of the self-balancing scooter in operation,
wherein the differential drive coupler includes (i) a drive coupler section disposed between the first and second platform interfaces, and (ii) a rider interface section projecting outwardly from the first and second platform interfaces, the rider interface section pointed in a generally upward direction perpendicular to and intersecting a common axis of rotation of the first and second foot platforms.

15. The self-balancing scooter of claim 14, wherein the first and second platform interfaces are detachably connected to the first and second foot platforms respectively at respective central and abutting edges.

16. The self-balancing scooter of claim 14, wherein the first and second platform interfaces include respective clamping mechanisms by which the first and second platform interfaces are firmly attached to the respective foot platforms.

17. The differential control apparatus of claim 14, wherein the differential drive coupler comprises a pair of drive appendages diametrically disposed to project radially into matching appendage seats in each of the first and second platform interfaces.

18. A differential control apparatus for a self-balancing scooter, comprising:
a first platform interface configured to be rigidly connected to a first foot platform of the self-balancing scooter;
a second platform interface configured to be rigidly connected to a second foot platform of the self-balancing scooter; and
a differential drive coupler mechanically coupled to the first platform interface and the second platform interface to impart rotational motion thereto in response to a mechanical control input, including (i) rotating the first and second foot platforms equally in opposing directions about a Y axis extending between first and second wheels of the self-balancing scooter in response to rotation of the differential drive coupler about a Z axis perpendicular to the Y axis, and (ii) rotating the first and second foot platforms equally in a same direction in response to rotation of the differential drive coupler about the Y axis.

* * * * *